H. O. SCRANTON.
SOIL PULVERIZER.
APPLICATION FILED FEB. 13, 1919.
1,321,248.
Patented Nov. 11, 1919.
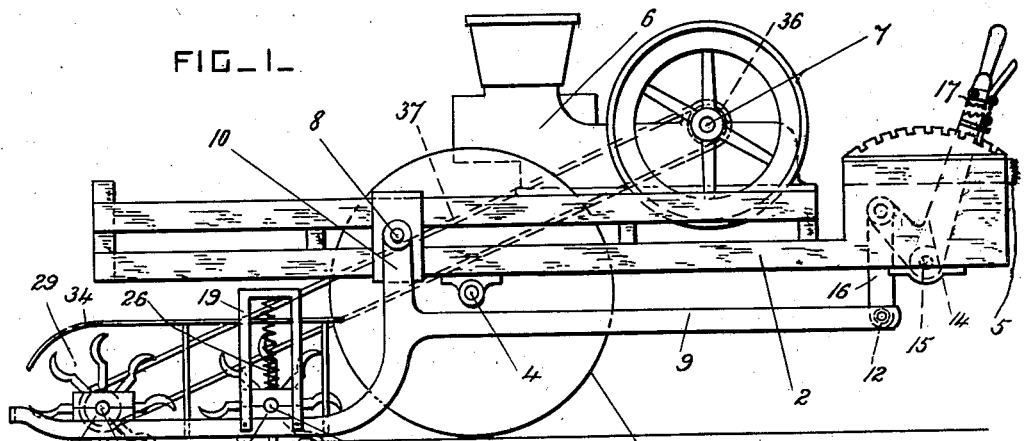
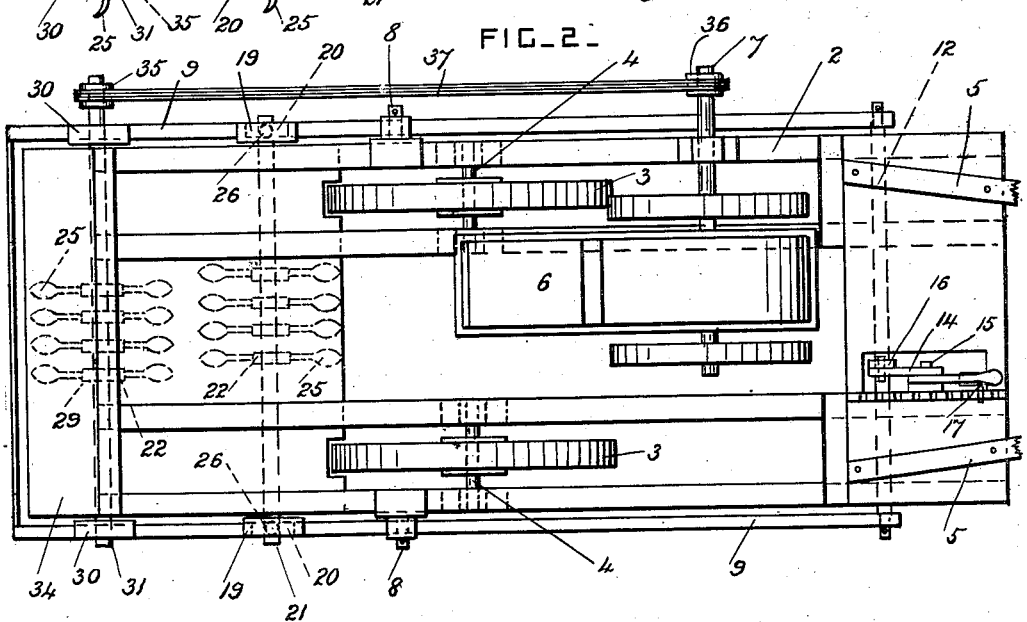
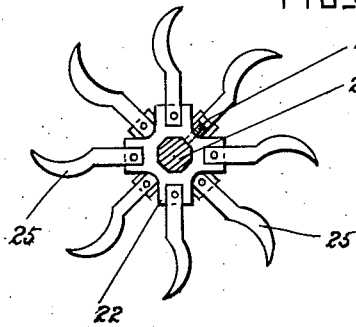
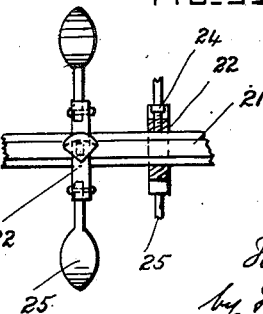
Inventor
Henry O. Scranton
by Herbert W. Jenner.
Attorney.

UNITED STATES PATENT OFFICE.

HENRY OSBERT SCRANTON, OF JEANERETTE, LOUISIANA.

SOIL-PULVERIZER.

1,321,248.                    Specification of Letters Patent.        Patented Nov. 11, 1919.

Application filed February 13, 1919. Serial No. 276,810.

*To all whom it may concern:*

Be it known that I, HENRY O. SCRANTON, a citizen of the United States, residing at Jeanerette, in the parish of Iberia and State of Louisiana, have invented certain new and useful Improvements in Soil-Pulverizers, of which the following is a specification.

This invention relates to pulverizing machines provided with rotary cylinders having teeth for engaging with the soil; and it consists in the novel construction and combination of the parts hereinafter fully described and claimed.

In the drawings, Figure 1 is a side view of a pulverizing machine constructed according to this invention. Fig. 2 is a plan view of the same. Fig. 3 is a detail side view of a portion of one of the pulverizing cylinders showing how the teeth are constructed and arranged. Fig. 4 is an end view of the same.

A suitable frame or cart 2 is provided, and is mounted on two ground wheels 3 journaled on shafts or axle spindles 4. This frame has suitable shafts 5 or other draft attachments for horses or for a tractor, or it may be self propelled, if desired.

Any approved form of motor 6 is mounted on the frame 2, and 7 is its driving shaft. A gas or gasolene engine is preferably used, and it is preferably arranged in front of the axis of the ground wheels 3. Pivots 8 are provided, and they project laterally from the frame 2 to the rear of the axis of the ground wheels, and are arranged one on each side of the machine. Levers 9 are provided, and have upwardly projecting arms 10 at their middle parts which are mounted on the pivots 8. The front ends of the levers are connected together by a crossbar 12, and 14 is a bell-crank lever pivoted to the frame by a pin 15 at the front part of the machine adjacent to the seat of the driver. The bell-crank lever is pivotally connected with the crossbar 12 by a link 16, and the said lever is provided with catch mechanism 17 of any approved construction for holding it in position.

The rear portions of the levers 9 are provided with vertical guides 19 on their upper sides, and 20 are bearings which slide vertically in the guides 19. A shaft 21 is journaled in the bearings 20, and its main portion between the bearings 20 is preferably octagonal. Hubs 22 are mounted on the shaft 21, and are secured to it by set-screws 24, or other means so that they may be suitably adjusted and spaced apart. Teeth 25 are bolted or riveted to the hubs 22, and are of any approved shape. These teeth preferably have radial shanks and curved and pointed end portions. The pointed end portions are preferably spoon-shaped and are wider than the shanks. Each hub preferably has four teeth arranged at equal distances apart, and the hubs are preferably arranged so that the teeth of every other hub are in the same planes, and so that the teeth of the intervening hubs are in intermediate positions as shown in Fig. 3, so as to form a toothed cylinder having its teeth arranged in staggered relation. Springs 26 are provided in the guides 19 to press the shaft bearings downwardly.

A second toothed cylinder 29 is journaled in bearings 30 behind the front toothed cylinder. The bearings 30 are rigidly secured to the two levers 9, and the cylinder shaft 31 is journaled in these bearings, and is octagonal similar to the shaft 21. Hubs 22 having teeth 25 similar to those of the shaft 21, are secured to the rear cylinder shaft 31. A protecting casing or cover 34 of thin sheet metal is arranged over the two toothed cylinders, and is supported from the levers 9.

A sprocket wheel 35 is secured on the rear shaft 31, and a sprocket wheel 36 is secured on the driving shaft 7 of the motor. A drive chain 37 passes over the sprocket wheels 35 and 36, so that the rear toothed cylinder is revolved directly and positively from the motor. Any other approved intermediate driving devices may however be used for driving the rear toothed cylinder from the motor. The pivots 8 of the levers are arranged on a line or substantially on a line drawn through the centers of the shaft of the rear cylinder and of the driving shaft 7 of the motor, so as to permit of the adjustment of the levers without interfering with the action of the drive chain. The toothed cylinders are made long enough to project over the tracks of the ground wheels, which are arranged relatively near together in the frame.

When the machine is drawn along, the front toothed cylinder is revolved by contact with the ground, and its teeth are pressed into the ground by the springs, the depth of their engagement with the soil being regulated by means of the operating lever 14. The front toothed cylinder breaks the soil into clods and loosens it; and the rear toothed cylinder, which is revolved positively at any desired speed, breaks up the clods and reduces the soil to a pulverized condition suitable for planting seeds.

What I claim is:

1. In a soil pulverizer, a wheeled frame, a motor mounted on the frame, adjustable levers pivoted to the frame at opposite sides thereof, guides secured to the rear portions of the said levers, a revoluble front toothed cylinder slidable vertically in the said guides, springs pressing the said cylinder downwardly, a second toothed cylinder supported by the said levers behind the front cylinder, and means for revolving the rear cylinder positively from the said motor.

2. In a soil pulverizer, a wheeled frame, a motor mounted on the frame, adjustable levers pivoted to the frame, guides secured to the rear portions of the said levers, bearings slidable vertically in the said guides, springs pressing the bearings downwardly in the guides, a shaft journaled in the said bearings, a series of hubs adjustably secured on the said shaft and provided with teeth for breaking up the soil, a toothed cylinder supported by the said levers and arranged to the rear of the said shaft, and means for revolving the said toothed cylinder positively from the said motor.

3. In a soil pulverizer, a frame provided with ground wheels, a motor mounted on the frame in front of its wheels, adjustable levers provided at their middle parts with upwardly projecting arms which are pivoted to the frame to the rear of its wheels, a front toothed cylinder supported by the said levers and arranged behind the ground wheels, a rear toothed cylinder having its shaft journaled in bearings on the said levers, a driving wheel secured on the said shaft, a driving wheel secured on the driving shaft of the motor, and a flexible driving device passing over the said driving wheels, the said levers being pivoted substantially on a line drawn through the centers of the two said shafts.

In testimony whereof I have affixed my signature.

HENRY OSBERT SCRANTON.